(No Model.)
H. B. COBB.
METHOD OF INCASING TUBING COMPOSED OF PLASTIC MATERIALS.
No. 408,374. Patented Aug. 6, 1889.
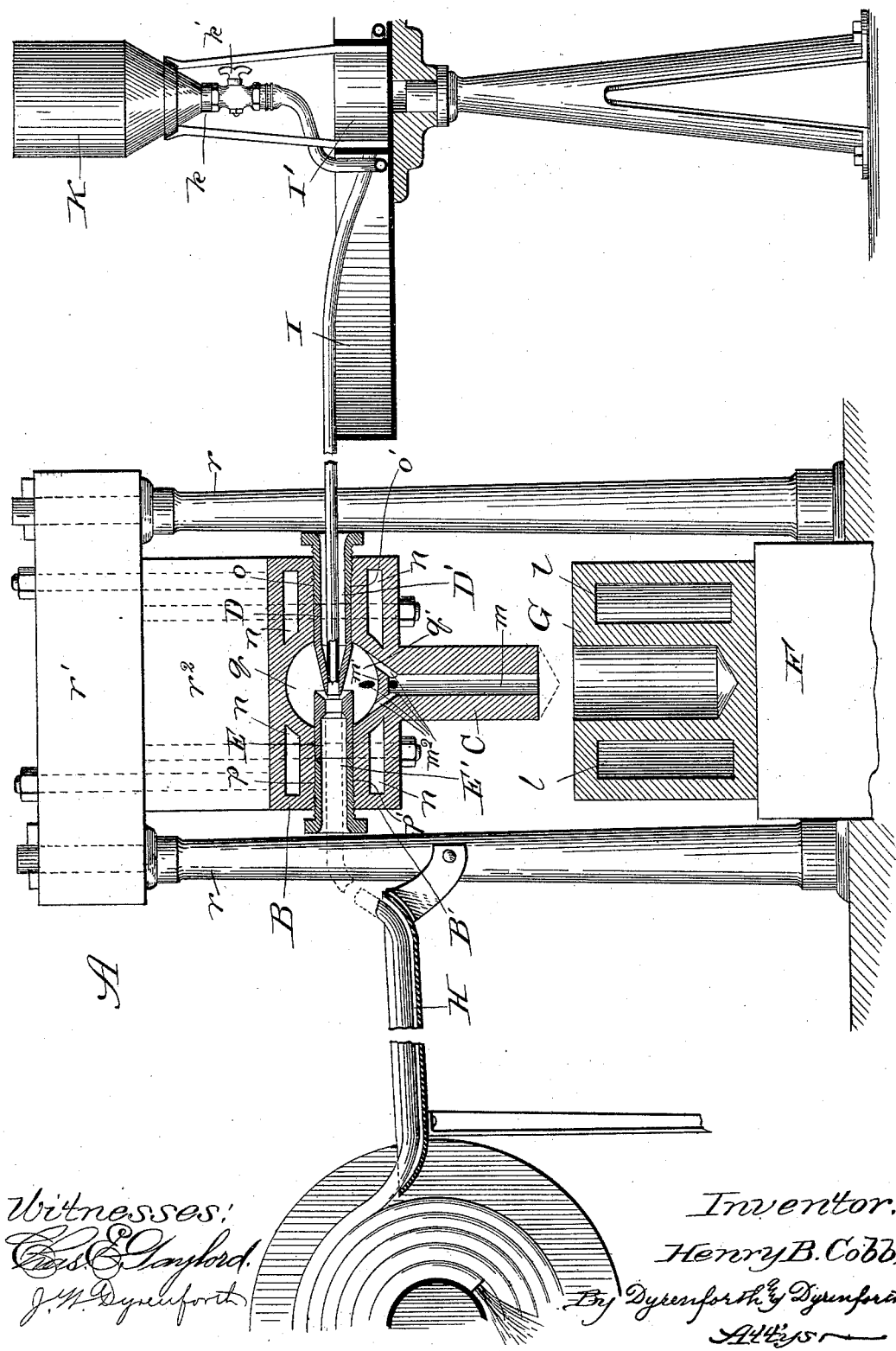
Witnesses:
Inventor:
Henry B. Cobb,
By Dyrenforth & Dyrenforth
Attys

UNITED STATES PATENT OFFICE.

HENRY B. COBB, OF WILMINGTON, DELAWARE.

METHOD OF INCASING TUBING COMPOSED OF PLASTIC MATERIALS.

SPECIFICATION forming part of Letters Patent No. 408,374, dated August 6, 1889.

Application filed October 5, 1888. Serial No. 287,269. (No model.)

*To all whom it may concern:*

Be it known that I, HENRY B. COBB, a citizen of the United States, residing at Wilmington, in the county of New Castle and State of Delaware, have invented a new and useful Improvement in Method of Incasing Tubing Composed of Plastic Materials, of which the following is a specification.

My invention relates, in its broadest sense, to the coating of soft tubing formed of plastic material, with a protective armor to prepare it for subsequent hardening by compression or for vulcanization, or for both compressing and vulcanizing it.

The object of my improvement is to prepare tubing composed of soft or plastic material in a manner to enable it to be handled without injury for subsequent treatment to which it is subjected for densifying or vulcanizing it, or both, the latter treatment being described and claimed in another application for Letters Patent, Serial No. 287,271, filed concurrently with the present on the 5th day of October, 1888; and it is also my object to provide the tubing with a metal shield, affording a permanent, close, and continuous coating of metal.

To this end my invention consists in molding upon the plastic tubing, while passing it through a die, a close-fitting metal shield, and causing a fluid to pass through the tubing during the operation of molding the shield.

My invention also consists in the more detailed steps resorted to in the practice of my improved method.

In the accompanying drawing is represented, diagrammatically, apparatus suitable for the practice of my improvement, and comprising a lead-press, shown in broken sectional elevation, fed with the tubing to be coated from a rotary pan having a central core, from which the tubing is unwound in feeding it, and supporting a water-tank, a reel being also shown upon which to wind the coated tubing as it is formed.

Novel features of construction in the apparatus illustrated in the present connection are particularly set forth and claimed in a separate concurrent application for Letters Patent, Serial No. 287,270, filed October 5, 1888.

A is a lead-press having the metal column $r$, supported on a suitable base (not shown) and surmounted by the metal block $r'$. Below the block $r'$, and secured to or cast with it, is a head $r^2$.

B is a metal block having a chamber $q$ in one side, and semi-cylindrical channels $p$ and $o$ in the same side and leading from opposite directions into the chamber $q$, and around the chamber $q$ is formed in the block B a horizontal chamber $n$ for steam.

B' is another block having a chamber $q'$ in one side and semi-cylindrical channels $p'$ and $o'$ leading from opposite directions, and, like the channels $p$ and $o$, from the outer lateral sides of the block, into the chamber $q'$, and a steam-chamber $n'$ is provided around the chamber $q'$. A hollow plunger C extends from the side of the block B', opposite that in which the chamber $q'$ is provided, the passage $m$ in the plunger being cylindrical and extending through it into the said chamber.

The parts B and B' are secured to the under side of the head $r^2$ and to each other in a manner to cause the chambers $q$ and $q'$ and the channels $p\,p'$ and $o\,o'$ to coincide, as shown. The upper end of the passage $m$ in the plunger is covered by a bridge $m'$, having openings $m^2$—preferably four in number and equidistant apart—between the edge of the bridge (which may be integral with the block B') and edge of the mouth of the passage $m$, the openings affording communication between the plunger-passage and chamber $q'$.

D is a core-tube tapering toward one end to the extremity thereof on its outer side and tapering on the inside part way only toward the end and cylindrical the rest of the way, as shown.

E is a die-tube concave at one end and having a bore resembling that in the tube D.

The tubes D and E are inserted into the passage afforded by the coincident channels $o\,o'$ and $p\,p'$, respectively, from opposite ends thereof and meet at their respective tapering and concave extremities near the center of the chamber $q\,q'$, the tube D thus entering the concave end of the tube E and the bores in both tubes coinciding. The tubes are not sufficiently long to extend to the outer extremities of the passages provided to receive them, thereby leaving sufficient space behind each (and which is threaded as shown) to receive hollow externally-threaded plugs D' and E', which should flare, as shown, toward their outer ends.

F is a ram of ordinary construction in machines of the class to which the present apparatus relates, and operated, preferably, by hydraulic pressure, (to effect which operation the means are not, however, shown in the present connection, inasmuch as they involve no features of novelty, and are common for the purpose,) and G is a receptacle known as the "lead-cylinder" in lead-presses, the inside bottom of which is synclinal in shape, and in the wall of the receptacle is a circumferential passage $l$ for steam. The receptacle G is supported on the ram F (which reciprocates vertically) in a position wherein the plunger C coincides with the chamber portion thereof.

The operation is as follows: The receptacle G is supplied with the substance with which the shield is to be formed, as molten glass, lead, or other metal. As lead is the material which I use for coating the plastic tubing, the description will hereinafter be confined to the application of lead, the operation of providing the coating with any other suitable molten metal being, however, substantially the same. The lead is introduced into the lead-cylinder in a molten state, after which it is permitted to set for a few minutes, (about four,) when the ram is actuated to raise the cylinder against the stationary plunger C, through which the pressure forces the lead into the chamber $q\ q'$. The plastic tubing, which is supported by being wound upon a suitable holder, as hereinafter described, is then inserted at one end through the core-tube D into the die-tube E, and becomes coated with the lead forced by the pressure of the ram into the die-tube around the plastic tubing, which is moved with its leaden shield out of the machine by the pressure of lead, the feeding of the tubing being controlled to correspond with the speed of egress of the coated product by an operator at the holder referred to. As the lead-covered tubing emerges from the machine it enters an inclined trough H, through which a stream of cold water is constantly caused to flow, and is thereby cooled to permit its being handled to wind upon a reel. (Not shown.)

The preferred holder for the plastic tubing comprises a pivotal and horizontally-supported pan I, having a central core I'. To adapt the holder to my purpose, I support upon the core a water-tank K, having a spout $k$, containing a suitable shut-off valve $k'$. The tubing, which has previously been wound around the core I' and should be filled with water confined in it by clamping the ends or pinching them to cause them to stick together if the substance forming the tubing be plastic rubber, is connected at the innermost end of the coil to the spout $k$, whence water is caused to flow continuously through it. This flow of water tends to prevent injury to the tubing from the heat of the molten coating substance in the chamber $q\ q'$, if it be stopped—as for recharging the chamber—in its passage through the machine, and thus permits practically unlimited length of the tubing to be coated and without regard to the capacity of the receptacle G.

Water is, so far as I am aware, the most convenient medium for use in maintaining the tubing during the coating operation in a cool condition. Obviously, however, any other liquid which would answer the purpose was and is considered an equivalent thereof, as also was any suitable aeriform fluid; and if air be the fluid used it is not absolutely necessary that mechanical means be employed to force it through the tubing, since the ends of the latter being open, the heat will produce the desired passage of air through it and prevent burning of the tubing during the coating operation and collapse thereof in cooling.

The product of my described method is thus tubing of plastic material provided with a close-fitting shield, which protects the tubing from injury while in its plastic condition.

What I claim as new, and desire to secure by Letters Patent, is—

1. The method of coating the exterior surface of tubing formed of plastic material, which consists in molding upon it a close-fitting metal shield and passing a fluid through the tubing while the shield is being formed thereon, substantially as described.

2. The method of coating with metal the exterior surface of tubing formed of plastic material, which consists in melting the metal, passing the tubing through a suitable die, forcing the metal into the die around the tubing, and passing a suitable fluid through the tubing while the coating is being formed thereon, substantially as described.

HENRY B. COBB.

In presence of—
M. J. BOWERS,
J. W. DYRENFORTH.